United States Patent [19]

Blanton, Jr. et al.

[11] 4,115,249

[45] Sep. 19, 1978

[54] PROCESS FOR REMOVING SULFUR FROM A GAS

[75] Inventors: William A. Blanton, Jr.; Robert L. Flanders, both of San Anselmo, Calif.

[73] Assignee: Chevron Research Company, San Francisco, Calif.

[21] Appl. No.: 751,640

[22] Filed: Dec. 17, 1976

Related U.S. Application Data

[63] Continuation-in-part of Ser. No. 666,115, Mar. 11, 1976, Pat. No. 4,071,436.

[51] Int. Cl.² .................. C10G 11/02; B01J 21/28; C01B 17/00
[52] U.S. Cl. .................................. 208/120; 208/113; 252/455 Z; 423/244; 423/563
[58] Field of Search ............... 423/556, 561, 563, 564, 423/650, 651, 655, 566, 244; 208/120, 113; 252/417, 455 Z

[56] References Cited

U.S. PATENT DOCUMENTS

| | | | |
|---|---|---|---|
| 3,699,037 | 10/1972 | Annesser et al. | 208/120 |
| 3,755,535 | 8/1973 | Naber | 423/244 |
| 3,788,977 | 1/1974 | Dolbear et al. | 208/120 |
| 3,832,445 | 8/1974 | Kouwenhoven et al. | 423/244 |
| 3,835,031 | 9/1974 | Bertolacini et al. | 208/120 |
| 3,930,987 | 1/1976 | Grand | 208/120 |
| 3,949,684 | 4/1976 | Copeland | 423/556 |
| 3,985,640 | 10/1976 | Lussier et al. | 208/120 |

FOREIGN PATENT DOCUMENTS

2,444,911  4/1975  Fed. Rep. of Germany ........... 208/120

Primary Examiner—O. R. Vertiz
Assistant Examiner—Gary P. Straub
Attorney, Agent, or Firm—D. A. Newell; R. H. Davies; W. D. Reese

[57] ABSTRACT

Sulfur oxides are removed from flue gas in a catalyst regenerator in a fluid catalyst cracking system while liquid-hydrocarbon product yield from the system is maintained at a high level by heating a particulate silica-containing cracking catalyst to 800–1500° F; impregnating 0.1 to 25 weight percent aluminum onto the catalyst particles; and cycling the resulting particles through the cracking reactor and catalyst regenerator in the cracking system.

6 Claims, 1 Drawing Figure

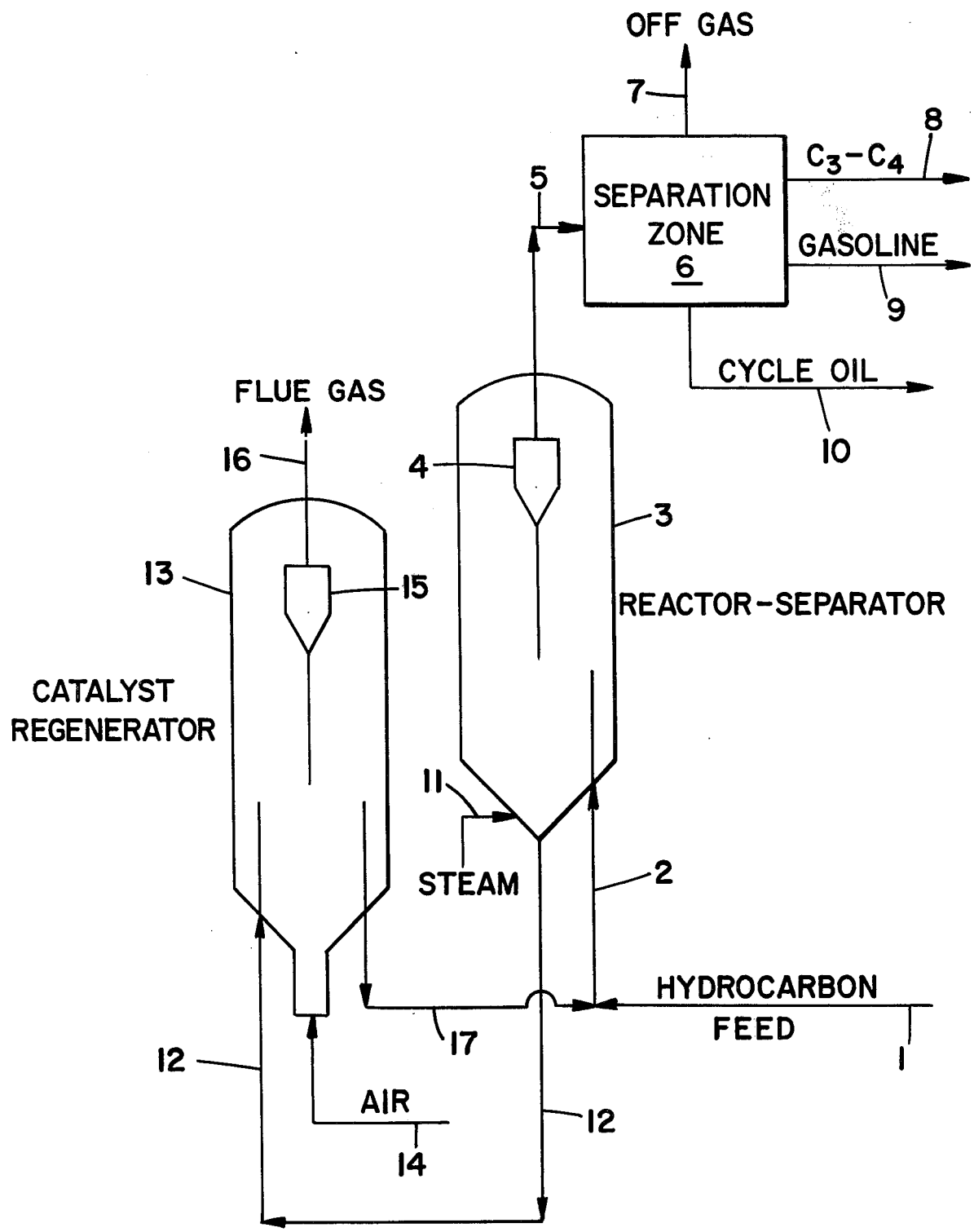

PROCESS FOR REMOVING SULFUR FROM A GAS

CROSS REFERENCE

This application is a continuation-in-part of our copending application Ser. No. 666,115, filed on Mar. 11, 1976, now U.S. Pat. No. 4,071,436.

BACKGROUND OF THE INVENTION

The present invention relates to a process for removing sulfur compounds from regenerator flue gas in a fluid catalyst cracking system.

Modern catalytic hydrocarbon cracking systems use a moving bed or a fluidized bed of a particulate catalyst. The cracking catalyst is subjected to a continuous cyclic cracking reaction and catalyst regeneration procedure. In a fluidized catalytic cracking (FCC) system, a stream of hydrocarbon feed is contacted with fluidized catalyst particles in a hydrocarbon cracking zone, or reactor, usually at a temperature of about 800°–1100° F. The reactions of hydrocarbons in the hydrocarbon stream at this temperature result in deposition of carbonaceous coke on the catalyst particles. The resulting fluid products are thereafter separated from the coked catalyst and withdrawn from the cracking conversion zone. The coked catalyst is then stripped of volatiles and passed to a catalyst regeneration zone. In the catalyst regenerator, the coked catalyst is contacted with a gas containing a controlled amount of molecular oxygen to burn off a desired portion of coke from the catalyst and simultaneously to heat the catalyst to a high temperature desired when the catalyst is again contacted with the hydrocarbon stream in the cracking zone. The catalyst is then returned to the cracking zone, where it vaporizes the hydrocarbons and catalyzes hydrocarbon cracking. The flue gas formed in the catalyst regenerator is separately removed from the regenerator. This flue gas, which may be treated to remove particulates and carbon monoxide from it, is normally passed into the atmosphere.

The fluid products stream recovered from the reactor in a catalytic cracking unit includes a light gas fraction and a liquid hydrocarbon fraction. The term "light gas fraction", as used herein, means all components of the fluid products stream which have a normal boiling point below the boiling point of propane. The term "liquid hydrocarbon fraction", as used herein, means all $C_3$ and higher boiling components of the fluid products stream. The yield of the liquid hydrocarbon fraction is normally represented in terms of volume percent of the hydrocarbon feed to the FCC reactor. Since the liquid hydrocarbon fraction contains substantially all the valuable components in the fluid product stream, the level of volume percent yield is one of the most important indications of the practicability of a particular FCC operation. In any given FCC unit, a decline in liquid product yield of greater than one volume percent of the feed rate as a result of any change in process parameters is a sufficiently negative result that the change in parameters cannot be economically tolerated in commercial operations. Thus, any deviation from normal, optimum operation of an FCC unit resulting in a decline in liquid product yield of over one percent is impracticable.

The hydrocarbon feeds processed in commercial FCC units normally contain sulfur, herein termed "feed sulfur". It has been found that about 2–10%, or more, of the feed sulfur in a hydrocarbon feed stream processed in an FCC system is invariably transferred from the feed to the catalyst particles as part of the coke formed on the catalyst particles. Sulfur deposited on the catalyst, herein termed "coke sulfur", is eventually cycled from the conversion zone with the coked catalyst to the regenerator. About 2–10% or more of the feed sulfur is thus continuously cycled from the conversion zone into the catalyst regeneration zone with the coked catalyst.

In an FCC catalyst regenerator, sulfur contained in the coke is burned, along with the coke carbon, forming primarily gaseous sulfur dioxide and sulfur trioxide which are conventionally removed from the regenerator in the flue gas.

Most of the feed sulfur does not become coke sulfur in the reactor. Instead, it is converted either to normally gaseous sulfur compounds, e.g., hydrogen sulfide, and carbon oxysulfide, or to higher boiling range organic sulfur compounds. These fluid sulfur compounds are carried along with the fluid products recovered from the reactor. About 90% or more of the feed sulfur is continuously removed from the reactor in the fluid stream of effluent processed hydrocarbons, with 40–60% of this being removed as hydrogen sulfide. Provisions are conventionally made to recover hydrogen sulfide from the fluid reactor effluent. Typically, a very-low-molecular-weight off-gas vapor stream is dseparated from the $C_3+$ liquid hydrobcarbons in a gas recovery unit and the off-gas is treated, as by scrubbing it with an amine solution, to remove the hydrogen sulfide. Removal of sulfur compounds such as hydrogen sulfide from the fluid effluent from an FCC reactor is relatively simple nd inexpensive as compared to removal of sulfur oxides from an FCC regenerator flue gas by conventional methods.

It has been suggested to reduce the amount of sulfur in FCC regenerator flue gas in commercial units, when necessary, by either: (1) desulfurizing the hydrocarbon FCC feed in a separate desulfurization unit to reduce the amount of feed sulfur prior to processing the feed in the FCC unit; or (2) desulfurizing the regenerator flue gas itself, by a conventional flue gas desulfurization procedure, after the flue gas has been removed from the FCC regenerator. Both of the foregoing alternatives require elaborate additional processing operations and necessitate substantial additional capital and utilities expenses in a petroleum refinery. For this reason, the cost of processing high-sulfur feedstocks in FCC units is high. Yet, many of the petroleum stocks currently available for processing in FCC units have a high sulfur content. Thus, the inclusion of expensive extraneous equipment and procedures in refinery operations to reduce the amount of sulfur in the flue gas removed from an FCC unit is a major problem in commercial FCC processing systems. If gaseous sulfur compounds normally removed from the unit in the flue gas are instead removed from the reactor as hydrogen sulfide along with the processed hydrocarbons, this sulfur then is simply a small addition to the large amount of hydrogen sulfide and organic sulfur already present in the reactor effluent. The small added expense, if any, of removing even as much as 5–15% more hydrogen sulfide from FCC reactor off-gas using available hydrogen sulfide removal means is substantially less than the expense incurred if separate feed desulfurization or flue gas desulfurization is instead used to reduce the amount of sulfur in the regenerator flue gas. Hydrogen sulfide recovery systems used with present commercial FCC units already have the capacity to remove additional hydrogen sulfide from the off-gas. Present off-gas hydrogen sulfide removal facilities could thus handle the additional hydrogen sulfide which would be added to the off-gas if feed sulfur charged to the FCC system were substantially all removed from the system as fluid sulfur compounds in the FCC reactor effluent product stream. It is accordingly desirable to direct substantially all feed sulfur into the fluid products removal pathway from the FCC reactor in order to reduce the amount of sulfur in the FCC regenerator flue gas, rather than either: (1) desulfurizing the hydrocarbon feed prior to charging it to the FCC conversion zone, or (2) subsequently desulfurizing the regenerator flue gas after it is removed from the FCC regenerator.

It has been suggested, for example in U.S. Pat. No. 3,699,037, to reduce the amount of sulfur oxides in FCC regenerator flue gas by adding particles of Group II-A metal oxides and/or carbonates, such as dolomite, MgO or $CaCO_3$, to the circulating catalyst in an FCC unit. The Group II-A metals react with sulfur oxides in the flue gas to form solid sulfur-containing compounds. The Group II-A metal oxides lack physical strength, and regardless of the size of particles introduced, they are rapidly reduced to fines by attrition, and rapidly pass out of the FCC unit with the catalyst fines. Thus, addition of dolomite and the like Group II-A materials must be continuous, and large, uneconomical amounts of the materials must be employed, in order to reduce the level or flue gas sulfur oxides for any significant period of time. Further, the use of once-through materials of this type creates disposal problems.

It has also been suggested, for example in U.S. Pat. No. 3,835,031, to reduce the amount of sulfur oxides in FCC regenerator flue gas by impregnating a Group II-A metal oxide onto a conventional silica-alumina cracking catalyst. The attrition problem encountered when using unsupported Group II-A metals is thereby partially obviated. However, it has been found that Group II-A metal oxides, such as magnesia, when used as a component of cracking catalysts, have a highly undesirable effect on the activity and selectivity of the cracking catalyst. The addition of a Group II-A metal to a cracking catalyst results in two particularly noticeable adverse consequences relative to the results obtained without the Group II-A metals: (1) the yield of the liquid hydrocarbon fraction is substantially reduced, typically by greater than one volume percent of the feed volume; and (2) the octane rating of the gasoline or naphtha fraction (75°–430° F boiling range) is substantially reduced. Both of the above adverse consequences are severely detrimental to the economic viability of an FCC operation. Even complete removal of sulfur oxides from regenerator flue gas could not compensate for the losses in yield and octane which result from adding Group II-A metals to an FCC catalyst.

Alumina has been a component of many FCC and other cracking catalysts, but primarily in intimate chemical combination with silica. Alumina itself has low acidity and is generally considered to be undesirable for use as a cracking catalyst. The art has taught that alumina is nonselective, i.e., the cracked hydrocarbon products recovered from an FCC or other cracking unit using an alumina catalyst would not be the desired valuable products, but would include, for example, relatively large amounts of coke and $C_2$ and lighter hydrocarbon gases. Intimate combinations of alumina with silica, e.g., as cogels, clays, zeolites, etc., have been found to be high in acidity, and are excellent cracking catalysts. They are used in most, if not all, commercial FCC units. These catalysts are not calcined, or otherwise heated to high temperatures prior to addition of components such as silica and alumina. Likewise, such catalysts are not normally heated to high temperatures after being formed into particles and before FCC use.

SUMMARY OF THE INVENTION

An object of the present invention is to provide a method for reducing the amount of sulfur oxides in the flue gas in a catalyst regenerator in a hydrocarbon cracking system while maintaining a high yield of $C_3+$ liquid hydrocarbon product from the cracking operation in the process.

Another object of this invention is to provide a method for reducing the amount of sulfur oxides in the flue gas in a catalyst regenerator in a hydrocarbon cracking system while maintaining the octane rating of the gasoline-boiling-range product from the cracking operation in the process at a high level.

In an embodiment, the present invention relates, in a hydrocarbon cracking process including the steps of (a) cycling a particulate cracking catalyst between a cracking zone and a catalyst regeneration zone in a catalytic cracking system; (b) contacting a sulfur-containing hydrocarbon feed with the catalyst in the cracking zone at cracking conditions, forming a sulfur-containing coke on the catalyst, and recovering from the cracking zone fluid products including a liquid hydrocarbons fraction; and (c) forming a sulfur oxides-containing flue gas by burning coke off the catalyst in the regeneration zone: to the method for decreasing the amount of sulfur in the flue gas comprising: (1) heating particles of a cracking catalyst comprising silica to a temperature between about 800° and about 1500° F; (2) impregnating the resulting catalyst particles with an amount of an aluminum compound sufficient to add from 0.1 to 25 weight percent aluminum, calculated on an elemental metal basis, to said catalyst particles; (3) cycling the resulting particles between the cracking zone and the regeneration zone in the catalytic cracking system; (4) reacting sulfur oxides in the flue gas with the added aluminum in the catalyst particles to form a sulfur-containing solid in the catalyst particles in the regeneration zone; and (5) forming hydrogen sulfide in the cracking zone by contacting the hydrocarbon feed with the sulfur-containing solid in the catalyst particles, and removing the resulting hydrogen sulfide from the cracking zone with the fluid products.

The invention further relates to a composition of matter for use in a catalytic hydrocarbon cracking system, formed by heating particles of cracking catalyst comprising silica to 800°–1500° F, and then impregnating the resulting particles with an amount of an aluminum compound sufficient to add from 0.1 to 25 weight percent aluminum, calculated on an elemental metal basis, to the resulting particles.

By heating a silica-containing catalyst to 800°–1500° F and then impregnating the catalyst with an aluminum compound, the aluminum thereby added is a superior reactant for removing sulfur oxides from FCC regenerator flue gas. Unless the silica-containing catalyst particles are heated prior to aluminum addition, the added aluminum is not an effective reactant.

The aluminum compound-impregnated cracking catalyst can be used to remove sulfur compounds from the regenerator flue gas without substantially adversely affecting the activity and selectivity obtained in the FCC system with the same cracking catalyst before impregnation. The yield of liquid hydrocarbon product from an FCC process can be maintained at substantially the same level as can be obtained with the same catalyst without impregnating the catalyst. The added aluminum does not have a substantial adverse effect on the octane number of the gasoline fraction formed in the FCC system. Sulfur oxides react with the added aluminum to form a sulfur-containing solid in the catalyst, and are thereby removed from the FCC flue gas before the gas leaves the regenerator. The catalyst particles, with the sulfur-containing solid therein, are then passed to the hydrocarbon cracking section of the FCC unit and contacted therein with the hydrocarbon feed. The sulfur-containing solid reacts with the hydrocarbon feed material, forming hydrogen sulfide, which is carried out of the FCC reactor in the off-gas component of the fluid products stream. The exit path of sulfur from the FCC unit is thereby shifted from the regenerator flue gas removal means to the FCC reactor fluid effluent removal means, so that substantially all the feed sulfur can be easily and economically handled by a conventional fluid products handling system.

DESCRIPTION OF THE DRAWING

The attached drawing is a schematic representation of an FCC unit depicted to facilitate illustration of the present invention.

Referring to the drawing, in general operation of the illustrated FCC system a sulfur-containing, combined fresh and recycle hydrocarbon feed, which may be preheated, is continuously passed into the FCC system by way of a conduit 1. The feed is combined with hot regenerated partculate catalyst in a riser conduit 2, and the stream of hydrocarbon feed and fluidized catalyst is passed upwardly through the riser 2, where most of the cracking and conversion of the hydrocarbons take place, and thereafter into a reactor-separator vessel 3. In the reactor-separator 3, a further amount of conversion of the hydrocarbon stream may take place. During contact with the hydrocarbon stream in the cracking or conversion zone, i.e., the riser 2 and the reactor-separator 3, sulfur-containing coke is deposited on the catalyst particles and off-gas is formed. The fluid products, including processed hydrocarbons and off-gas, is removed from the upper end of the reactor-separator 3, after having been separated from most of the entrained catalyst by means of a cyclone 4. The fluid products are withdrawn from the cyclone 4 and the reactor 3 through hydrocarbon and off-gas removal means such as a conduit 5, and passed into a gas recovery unit including a separation zone 6. In the separation zone 6, an off-gas stream rich in hydrogen sulfide is separated from a $C_3+$ liquid hydrocarbons fraction. The off-gas stream is withdrawn from the separation zone 6 through a conduit 7 and is passed to further conventional hydrogen sulfide recovery operations, such as an amine scrubber (not shown). A stream of $C_3-C_4$ hydrocarbons is withdrawn from the separation zone 6 through a conduit 8. A stream of gasoline-boiling-range hydrocarbons is withdrawn from the separation zone 6 through a conduit 9. A stream of cycle-oil-boiling-range hydrocarbons is withdrawn from the separation zone 6 through a conduit 10. Referring again to the reactor-separator 3, coked catalyst entering the vessel 3 from the riser 2 flows downwardly to the lower end of the vessel 3, either directly or after being separated from processed hydrocarbons and off-gas in the cyclone 4.

The coked catalyst particles in the lower end of the vessel 3 are stripped of volatile hydrocarbons using hot steam, which is introduced into the vessel 3 through the conduit 11. After being stripped, catalyst is passed from the reactor-separator 3 through a transfer conduit 12 into a catalyst regenerator 13. An oxygen-containing gas comprising air is introduced into the regenerator 13 through a conduit 14. In the regenerator 13 a fluidized bed of catalyst particles is contacted with the oxygen-containing gas to burn sulfur-containing coke off the catalyst, forming a flue gas mixture containing gaseous carbon oxides, steam, sulfur oxides, etc., and lowering the coke content of the catalyst particles in the fluidized bed in the regenerator 13. The resulting sulfur-containing flue gas is removed from the upper end of the regenerator vessel 13, after having been separated from most of the entrained catalyst by means of a cyclone 15. The separated flue gas is withdrawn from the cyclone 15 and the regenerator 13 through flue gas removal means such as a conduit 16, and is passed, if desired, to an electrostatic precipitator and a conventional carbon monoxide boiler (not shown). After conventional processing to recover heat values and remove particulates and undesirable compounds, e.g., carbon monoxide, the flue gas is then discarded. Coke-depleted, regenerated catalyst is continuously removed from the regenerator vessel 13 through a transfer conduit 17 and is cycled back to the riser 2 and contacted with the hydrocarbon feed stream in continued catalytic use as described above.

According to the invention, the particulate silica-containing cracking catalyst to be employed in the FCC system is heated to a temperature of 800°–1500° F, preferably 1000°–1400° F, and then impregnated with 0.1–25 weight percent, based on the catalyst weight, of an aluminum compound, preferably aluminum sulfate, and the resulting particles are then utilized as the cracking catalyst in the system. The cracking catalyst particles, prior to heating and aluminum compound impregnation, preferably contain 5–15 weight percent of a crystalline aluminosilicate zeolite in an amorphous silica-alumina matrix. Aluminum impregnated onto the previously heated catalyst particles reacts with sulfur oxides in the gas in the regenerator 13, forming a sulfur-containing solid including sulfur and aluminum atoms, e.g., aluminum sulfate, as a component of the reactant particles, and thereby removing sulfur from the flue gas. The sulfur-containing catalyst particles are thereafer removed from the regenerator vessel 13 and are passed through the conduit 17 into contact with the hydrocarbon feed in the riser 2. When contacted with the hydrocarbon feed in the riser 2, the sulfur-containing solid in the catalyst particles reacts with components of the hydrocarbons to form hydrogen sulfide. The catalyst particles are discharged into the reactor-separator 3 from the riser 2 along with the fluid products. The catalyst particles are separated from the fluid products, as described above. Hydrogen sulfide formed by reaction between the sulfur-containing solid and components of the hydrocarbon feed is then carried out of reactor as part of the fluid products stream removed from reactor-separator 3 through the conduit 5, thus changing the removal pathway from the FCC system of sulfur introduced to the system in the feed. The incremental amount of hydrogen sulfide thereby passed into the fluid products stream removed from the reactor-separator 3 by the conduit 5 is relatively small, typically, no more than about 5–15% of the hydrogen sulfide already present in the fluid products stream without the catalyst heating and aluminum compound impregnation steps. Accordingly, the extra amount of hydrogen sulfide can be easily recovered in a conventional manner. The amount of sulfur removed from the system in the flue gas from the regenerator 13, via the conduit 16, is thus substantially reduced, and the large added expense and operating inconvenience of subsequently removing sulfur compounds from the flue gas stream by a conventional flue gas desulfurization operation is thereby obviated. The aluminum-impregnated catalyst particles, once they are freed from sulfur in the riser 2 and the reactor-separator 3, are cycled to the regenerator vessel 13 through the transfer conduit 12 as in normal unit operation. Accordingly, no added operating steps or extraneous equipment are needed to remove sulfur compounds from the flue gas in an FCC system when operating according to the invention. The FCC system can be operated by substantially normal procedures and the regenerator flue gas can be freed from sulfur compounds by simply impregnating an aluminum compound on the silica-containing cracking catalyst used in the FCC system after heating the catalyst to 800°–1500° F and then circulating the resulting catalyst particles in the system.

DETAILED DESCRIPTION OF THE INVENTION

The composition of the present invention is formed by selecting the particulate silica-containing cracking catalyst desired for use in a particular cracking system according to criteria known in the art, and then heat treating the catalyst particles and impregnating them with an aluminum compound. Thus, the cracking catalyst employed may be selected on the basis of activity, selectivity, etc., without regard to the heating and impregnation steps of this invention, with selection being based on commercial factors well known to those skilled in the art and not forming any part of the invention. All known commerically used cracking catalysts include a substantial amount of silica.

The selected catalyst is first heated to a temperature of 800° to 1500° F. Preferably the catalyst is heated to a temperature between 1000° and 1400° F. The length of time of the heat treatment step is not critical, but should be at least 15 minutes, and preferably at least several hours. The heat treating step may be performed in a vacuum, in an inert atmosphere such as nitrogen, carbon dioxide, argon, etc., in an oxygen-containing gas such as air, in a reducing gas such as hydrogen, carbon monoxide, etc. The heating step may be performed in the presence of steam, if desired. Preferably, the heating step includes passing a heated gas stream in contact with the catalyst particles to be treated and then withdrawing the gas from contact. The heat treatment may take the form of conventional calcination, for example.

The heat treatment may also be performed by using the particulate silica-containing catalyst in a catalytic cracking system wherein the cracking conditions and/or regeneration conditions include a temperature within the 800°–1500° F range. Thus, cracking catalyst which has been used in a conventional fluid catalytic cracking operation, e.g., equilibrium catalyst, is adequately heat treated according to the present invention, since catalytic cracking conditions normally include both a cracking temperature and a regeneration temperature between 800° and 1500° F.

After heating the catalyst particles to 800°–1500° F, an aluminum compound is impregnated on the particles. The aluminum compound may be added, for example, by aqueous impregnation of the catalyst particles with a soluble aluminum salt such as aluminum sulfate, aluminum acetate or aluminum nitrate. An organic liquid may also be used as the impregnating medium. Aqeuous impregnation of an aluminum sulfate solution is the preferred method for aluminum addition according to the invention. The amount of aluminum added, calculated as the elemental metal, is from 0.1 to 25 weight percent of the weight of the catalyst after heating and prior to impregnation. Preferably, from 0.1 to 10 weight percent aluminum is added.

After impregnation of the aluminum compound, the resulting particles may be used directly in a catalytic cracking system.

In addition to an aluminum compound, various promoters can be added to the cracking catalyst after heating, such as vanadium, copper, chromium, iron, uranium or mixtures thereof. Vanadium is a preferred promoter metal. The promoter metals are added in an amount between 0.01 and 10 weight percent of the amount of added aluminum, calculated on the basis of the elemental promoter metal content. Preferably the promoter metals are present in the particles in an amount between 0.05 and 2 weight percent of the amount of added aluminum.

A small amount of a Group VIII noble metal, with platinum and palladium being the preferred noble metals, may also be added to the cracking catalyst after heating. If a noble metal promoter is employed, it is preferably employed in a very low concentration, e.g., 0.1 to 100 ppm, by weight, preferably 1–10 ppm, of the amount of aluminum added to the catalyst. In some cases, both a noble metal promoter and a vanadium, copper or other metal promoter may be employed.

Promoter metals may be added to the catalyst particles prior to impregnation of the aluminum compound, with the aluminum compound, or after the aluminum compound, as by the use of an aqueous or organic solution of the desired metal or metals. Likewise, any known method for combining the promoters with the catalyst particles may appropriately be used.

The particulate cracking catalyst employed may be a conventional particulate silica-containing cracking catalyst. Preferably, the catalyst is one including more than 10 weight percent silica, prior to impregnation, with a silica content of at least 30 weight percent being particularly preferred. Preferred catalysts are those containing combined silica and alumina, with greater than 10% silica. For example, the catalyst may be an amorphous cracking catalyst containing an amorphous mixture of 10–90% silica with alumina, or, more preferably, a zeolite-containing cracking catalyst including an amorphous silica-alumina matrix and a crystalline aluminosilicate zeolite. The amorphous matrix generally constitutes 85–95 weight percent of the cracking catalyst, with the remaining 5–15 weight percent being aluminosilicate zeolite component dispersed, or imbedded, in the matrix. The zeolite may be rare earth-exchanged or hydrogen-exchanged. Conventional zeolite-containing cracking catalysts often include an X-type zeolite or a Y-type zeolite.

EXAMPLE

A commercial zeolite-containing, silica-alumina FCC cracking catalyst was heated to a temperature of 1100°–1200° F by use in a commercial FCC unit. The resulting equilibrium catalyst was divided into two samples, A and B. Another portion of the same commercial catalyst was obtained fresh, without use in an FCC unit or otherwise having been heated after manufacture. The fresh silica-alumina catalyst was labeled sample C. Samples A and C were impregnated by a conventional procedure with sufficient aqueous solution of aluminum nitrate to provide 1 weight percent aluminum on the impregnated samples after drying, based on the weight of the catalyst samples before impregnation.

In order to measure the relative capacity of each of the three samples for reaction with sulfur oxides, 100 mg samples of each of the three samples were tested in a microbalance. Each sample was first heated to 1200° F in flowing nitrogen containing 2% $O_2$, 15% $CO_2$ and 10% $H_2O$, by volume. The weight of the sample was then recorded. Then, 0.2 vol. % $SO_2$ was added to the flowing gases and allowed to react with the sample. Addition of $SO_2$ was continued for 20 minutes. The weight of the samples was again recorded. The amount of SOx taken up in each sample to form a sulfur-containing solid is shown in the Table.

TABLE

|  | Sample A | Sample B | Sample C |
|---|---|---|---|
| SOx taken up (wt. %) | 0.075 | 0.004 | 0.011 |
| SOx after Reduction (wt. %) | −0.010* | 0.000 | — |
| Rate of SOx take up (ppm per minute, by wt.) | 44 | 6 | 9 |

*weight loss

Sample A, which, according to the invention, had been heated (by use in an FCC system) and had thereafter been impregnated with 1 wt. % aluminum, can be seen from the data shown in the Table to be many times more active than sample B, which had been heated (by use in an FCC system), but not impregnated with alumina after heating. Likewise, sample A is shown to be many times more active than sample C, which had been impregnated with 1 wt. % aluminum, but had not been heat treated at 800°-1500° F prior to impregnation with the aluminum nitrate. Thus, it is demonstrated that a catalyst treated according to the invention has a many times larger SOx retention capacity than either the same heat-treated catalyst without impregnation or the same catalyst impregnated with aluminum nitrate without heat treatment.

Sample A and sample B were further tested to determine their ability to regenerate by contact with a hydrocarbon. After the $SO_2$ absorption step and weighing, the temperature of each sample was reduced to 950° F, and nitrogen containing 20 vol. % 3-heptene and 10 vol % $H_2O$ was passed over each sample for 5 minutes. Flow of gas was then continued without the 3-heptene, at 950° F. Thereafter, 2 vol. % $O_2$ and 15 vol. % $CO_2$ were added to the flowing gases. When the sample weight was stable, the temperature was raised to 1200° F and flow was continued until the weight of the sample again stabilized. The weight of the sample was then taken. The weight percents of SOx remaining in samples A and B after hydrocarbon reduction and removal of coke are shown in the Table. It can be seen that sample A was completely regenerated by the hydrocarbon treatment.

Conventional cracking conditions employed in the cracking or conversion step in the FCC system are frequently provided in part by preheating or heat exchanging the hydrocarbon feed to bring it to a temperature of about 600°-750° F before introducing it into the cracking zone; however, preheating is not essential. A catalyst/hydrocarbon weight ratio of about 3 to about 10 is preferably used. A hydrocarbon weight space velocity in the cracking zone of about 5 to about 50 per hour is preferably used. The average amount of coke contained in the spent catalyst after contact with the hydrocarbon, at the time the catalyst is passed to the catalyst regenerator, is preferably between about 0.5 weight percent and about 2.5 weight percent, depending on the carbon content of regenerated catalyst in a particular FCC system, and the heat balance therein.

The sulfur-containing hydrocarbon feeds normally processed in commercial FCC systems may be processed in a cracking system employing the present invention. Suitable feedstocks include, for example, gas oils, light cycle oils, heavy cycle oils, etc., which usually contain about 0.1 weight percent to about 10 weight percent sulfur. Sulfur may be present in the hydrocarbon feed as a thiophene, disulfide, thioether, etc. Suitable feedstocks normally boil in the range from 400° to 1100° F or higher. A suitable feed may include recycled hydrocarbons which have already been processed.

The catalyst regeneration zone used in a cracking process employing the present invention may be of conventional design, and conventional catalyst regeneration conditions may be employed. The gaseous atmosphere inside the regeneration zone in an FCC system is normally comprised of a mixture of gases in concentrations which vary according to the locus within the regenerator. The concentrations of gases also vary according to the coke concentration on catalyst particles entering the regenerator, and according to the amount of molecular oxygen and steam passed into the regenerator. Generally, regeneration conditions include a gaseous atmosphere in the regenerator containing 5% to 25% steam, varying amounts of oxygen, carbon monoxide, nitrogen, carbon dioxide, sulfur dioxide, sulfur trioxide, sometimes a small amount of hydrogen sulfide, and traces of hydrogen, hydrocarbons, etc. The regeneration temperature is usually between 1000° and 1500° F, preferably between 1100° and 1400° F.

Impregnated aluminum contained in the catalyst particles reacts with the sulfur oxides contained in the flue gas within the regeneration zone to form a sulfur-containing solid, such as aluminum sulfate. The catalyst particles are then removed from the regeneration zone, freeing the flue gas from a substantial portion of the sulfur compounds therein. The flue gas withdrawn from the regeneration zone thus has a diminished sulfur content. The sulfur-containing catalyst particles are then passed to the cracking zone and are contacted therein with the hydrocarbon feed stream in the conventional manner. By contacting the catalyst particles having a sulfur-containing solid component with the feed at cracking conditions, the reaction between the sulfur-containing solid and components of the feed forms hydrogen sulfide. This incremental hydrogen sulfide is removed from the cracking zone along with the large amount of hydrogen sulfide normally formed in the cracking zone. Thus, no particular departures need be made from the conventional operating steps used in the cracking or conversion section of an FCC system when using an embodiment of the invention.

Waste gases from other refinery operations which contain sulfur oxides, dilute hydrogen sulfide, etc., may be passed into an FCC catalyst regenerator for disposal in some cases. The sulfur component of such gases can thereby be reacted with aluminum in the catalyst particles to form a sulfur-containing solid in the catalyst particles in the regenerator. The sulfur-containing solid is then reacted with components of the hydrocarbon stream in the cracking section of the FCC unit to form a further incremental amount of hydrogen sulfide in the reactor. The further incremental hydrogen sulfide is simply recovered with the rest of the off-gas hydrogen sulfide, e.g. in an amine scrubbing operation.

ILLUSTRATIVE EMBODIMENT

The FCC system shown in the drawing and described above is employed. The hydrocarbon feed employed is a gas-oil stock with an initial boiling point of about 650° F and an end boiling point of about 1050° F.

Catalyst particles made of a commercial, zeolite-containing, silica-alumina FCC catalyst are heat treated at 1260° F by use in the FCC system in conventional operation. The catalyst particles are then withdrawn from the system and impregnated with a sufficient amount of an aqueous aluminum sulfate solution to provide 5 weight percent aluminum, based on the catalyst weight prior to impregnation. The particles are then replaced in the FCC system and used as the catalyst. The hydrocarbon feed charged to the unit contains a relatively high sulfur concentration of 2.5 weight percent. The hydrocarbon feed is introduced into the conduit 1 at the rate of 766,000 pounds per hour at a temperature of 650° F and is passed into the riser 2. Regenerated, impregnated catalyst is passed into the riser 2 from the conduit 17 at the rate of 3,216,000 pounds per hour at a temperature of 1260° F. The catalyst and hydrocarbon feed are admixed in the riser 2, and the temperature of the resulting equilibrium catalyst-oil mixture is about 930° F. Sulfur in the aluminum sulfate-impregnated catalyst particles is converted to hydrogen sulfide during contact with the hydrocarbon. The average carbon content of regenerated catalyst particles entering the riser 2 from the conduit 17 is about 0.05 weight percent. The average residence time of the hydrocarbon stream in the riser 2 is 5 seconds. Catalyst particles entering the reactor-separator 3 from the riser 2 flow generally downwardly and are partially stripped of volatiles by steam, introduced into the reactor-separator 3 through the conduit 11 at the rate of 900 pounds per hour. Catalyst particles with sulfur-containing coke deposited thereon are passed through the transfer conduit 12 into the regenerator 13 at the rate of 3,241,000 pounds per hour. Catalyst entering the regenerator 13 from the conduit 12 has an average coke content of 0.84 weight percent, and the coke on the catalyst has an average sulfur content of 3.0 weight percent. Oxygen is introduced into the regenerator 13 at the rate of 87,200 pounds per hour in air at a temperature of 260° F. Combustion of the coke on the catalyst with oxygen heats the catalyst to a temperature of about 1260° F and produces a flue gas containing sulfur dioxide and sulfur trioxide. The flue gas also contains steam and about 2 weight percent oxygen. Aluminum added to the catalyst particles by impregnation is at least partly converted to alumina. In conventional operation of this FCC system, without benefit of the present invention, a flue gas containing 1890 ppm sulfur oxides, or 816 pounds per hour of sulfur, would have been removed from the regenerator 13 via the conduit 16. According to the present invention, the cracking catalyst has been heated to 1260° F by prior catalytic use in the FCC system and then impregnated with 5 weight percent aluminum. The sulfur oxides from the regenerator flue gas and the alumina in the catalyst particles resulting from oxidation of the impregnated aluminum react to form a sulfur-containing solid as a component of the catalyst. The average residence time of the impregnated catalyst particles in the regenerator 13 is 6 minutes. The catalyst particles having a sulfur-containing solid therein are removed from the regenerator 13 through the conduit 17 at the rate of 3,216,000 pounds per hour. About 773 pounds per hour of sulfur is removed from the flue gas in the regenerator 13 as a solid component of the catalyst particles. The flue gas removed from the regenerator 13 into the conduit 16 has a sulfur oxides concentration of only about 100 ppm. Thus, about 773 pounds per hour of sulfur are transferred from the regenerator flue gas removal stream into the reactor off-gas removal stream in the FCC system. The sulfur-containing solid in the catalyst particles is contacted with the hydrocarbon feed in the riser 2. Reaction between components of the hydrocarbon feed and the sulfur-containing solid results in the formation of an incremental amount of hydrogen sulfide in addition to the much larger amount of hydrogen sulfide conventionally formed by the hydrocarbon cracking reactions in the riser 2. The incremental amount of hydrogen sulfide released from the catalyst particles into the fluid products stream and thereafter withdrawn from the reactor-separator 3 through the conduit 5 is only about 8 weight percent of the amount of hydrogen sulfide already generated in the riser 2 in conventional operation. When not practicing the present invention, about 10,200 pounds per hour of hydrogen sulfide would normally be withdrawn from the reactor-separator 3 through the conduit 5. On the other hand, the relative amount of sulfur compounds removed from the flue gas within the regenerator 13 is very substantial compared to the amount of sulfur compounds in the flue gas. The concentration of sulfur-containing compounds in the flue gas finally removed from the regenerator 13 through the conduit 16, when operating according to the present invention, is only 100 ppm sulfur oxides, or 43 pounds of sulfur withdrawn per hour.

What is claimed is:

1. In a process for cracking a hydrocarbon in the absence of added hydrogen including the steps of (a) cycling a particulate cracking catalyst between a cracking zone and a catalyst regeneration zone in a catalytic cracking system; (b) contacting a sulfur-containing hydrocarbon feed with said catalyst in said cracking zone at cracking conditions, forming sulfur-containing coke on said catalyst, and recovering from said cracking zone fluid products including a liquid hydrocarbon fraction; and (c) forming a sulfur oxides-containing flue gas by burning coke off said catalyst in said regeneration zone; the method for decreasing the amount of sulfur in said flue gas which comprises the steps of:

(a) heating particles of a cracking catalyst consisting essentially of an amorphous silica-alumina matrix and a crystalline aluminosilicate zeolite to a temperature between 800° and 1500° F;

(b) impregnating the resulting catalyst particles with an amount of an aluminum compound sufficient to add from 0.1 to 25 weight percent aluminum, calculated on an elemental metal basis, to said catalyst particles;

(c) cycling the resulting impregnated catalyst particles between said cracking zone and said regeneration zone in said catalytic cracking system;

(d) reacting sulfur oxides in said flue gas with the added aluminum in said catalyst particles to form a sulfur-containing solid in said catalyst particles in said regeneration zone; and (e) forming hydrogen sulfide in said cracking zone by contacting said hydrocarbon feed with said sulfur-containing solid in said catalyst particles and removing the resulting hydrogen sulfide from said cracking zone with said fluid products.

2. A method according to claim 1 wherein 0.1 to 10 weight percent aluminum is added to said catalyst particles.

3. A method according to claim 1 wherein said catalyst particles are heated to a temperature between 1000° and 1400° F prior to impregnation with said aluminum compound.

4. A composition of matter comprising aluminum for reaction with sulfur oxides and a particulate cracking catalyst for cracking hydrocarbons in the absence of added hydrogen, said catalyst consisting essentially of an amorphous silica-alumina matrix and a crystalline aluminosilicate zeolite, prepared by the steps comprising:

(a) heating particles of said cracking catalyst to a temperature between 800° and 1500° F; and (b) impregnating the resulting catalyst particles with an amount of an aluminum compound sufficient to add from 0.1 to 25 weight percent aluminum, calculated on an elemental metal basis, to said catalyst particles.

5. A composition according to claim 4 wherein 0.1 to 10 weight percent aluminum is added to said particles.

6. A composition according to claim 4 wherein said catalyst particles are heated to a temperature between 1000° and 1400° F prior to impregnation with said aluminum compound.

* * * * *